United States Patent
Fuldner

(10) Patent No.: US 10,528,901 B2
(45) Date of Patent: Jan. 7, 2020

(54) MANAGING SERVICE PROVIDER ACCOUNTS BASED ON COMPLETION OF TASKS

(71) Applicant: Uber Technologies, Inc., San Francisco, CA (US)

(72) Inventor: Henry Gustav Fuldner, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 736 days.

(21) Appl. No.: 14/857,626

(22) Filed: Sep. 17, 2015

(65) Prior Publication Data

US 2016/0078394 A1    Mar. 17, 2016

Related U.S. Application Data

(60) Provisional application No. 62/051,769, filed on Sep. 17, 2014.

(51) Int. Cl.
| | |
|---|---|
| *G06Q 10/06* | (2012.01) |
| *G06Q 50/30* | (2012.01) |
| *H04W 4/02* | (2018.01) |
| *H04W 4/60* | (2018.01) |

(52) U.S. Cl.
CPC ..... *G06Q 10/063114* (2013.01); *G06Q 50/30* (2013.01); *H04W 4/023* (2013.01); *H04W 4/60* (2018.02)

(58) Field of Classification Search
CPC .......................................... G06Q 10/063114
See application file for complete search history.

(56) References Cited

U.S. PATENT DOCUMENTS

| | | | | |
|---|---|---|---|---|
| 6,006,159 A | * | 12/1999 | Schmier | G08G 1/123 340/988 |
| 6,226,570 B1 | * | 5/2001 | Hahn | B60K 28/066 701/1 |
| 6,553,379 B1 | | 4/2003 | Jaeger | |
| 6,756,913 B1 | * | 6/2004 | Ayed | G06Q 10/02 235/384 |

(Continued)

FOREIGN PATENT DOCUMENTS

| | | |
|---|---|---|
| KR | 10-2014-0016053 | 2/2014 |
| WO | WO 2014-030976 | 2/2014 |

OTHER PUBLICATIONS

International Search Report and Written Opinion issued in PCT/US2016/027869 dated Jul. 20, 2016.

*Primary Examiner* — Alan S Miller
*Assistant Examiner* — Arif Ullah
(74) *Attorney, Agent, or Firm* — Mahamedi IP Law LLP

(57) ABSTRACT

A system and method of classifying a driver as being capable of providing transport services are described. The system can receive information indicating that a driver is available to provide transport services from the driver's device. The system can cause the service application to display a prompt instructing the driver to perform a task. In response to detecting completion of the task based, at least in part, on location information about the driver's device, the system can classify the driver as being capable of providing transport services so that the service application can be enabled to receive an invitation for providing a transport service from the system.

20 Claims, 7 Drawing Sheets

(56) References Cited

U.S. PATENT DOCUMENTS

| | | | |
|---|---|---|---|
| 7,064,681 B2 * | 6/2006 | Horstemeyer | B60R 25/102 |
| | | | 340/573.4 |
| 8,781,501 B2 | 7/2014 | Kawazoe | |
| 2012/0323642 A1 * | 12/2012 | Camp | G06Q 10/02 |
| | | | 705/13 |
| 2013/0073327 A1 | 3/2013 | Edelberg | |
| 2014/0129302 A1 | 5/2014 | Amin | |

* cited by examiner

MANAGING SERVICE PROVIDER ACCOUNTS BASED ON COMPLETION OF TASKS

RELATED APPLICATIONS

This application claims the benefit of U.S. Provisional Patent Application No. 62/051,769, filed Sep. 17, 2014, titled MANAGING SERVICE PROVIDER ACCOUNTS BASED ON COMPLETIONS OF TASKS; the aforementioned application being incorporated by reference in its entirety.

BACKGROUND

Service providers can use a platform provided by a service arrangement system to receive invitations to perform services. For example, the on-demand service system can transmit an invitation to a service provider's device when that service provider is selected to provide a service for a requesting user. In some examples, service providers can operate service applications on their mobile devices in order to communicate with the service arrangement system.

DETAILED DESCRIPTION

Figure 1:
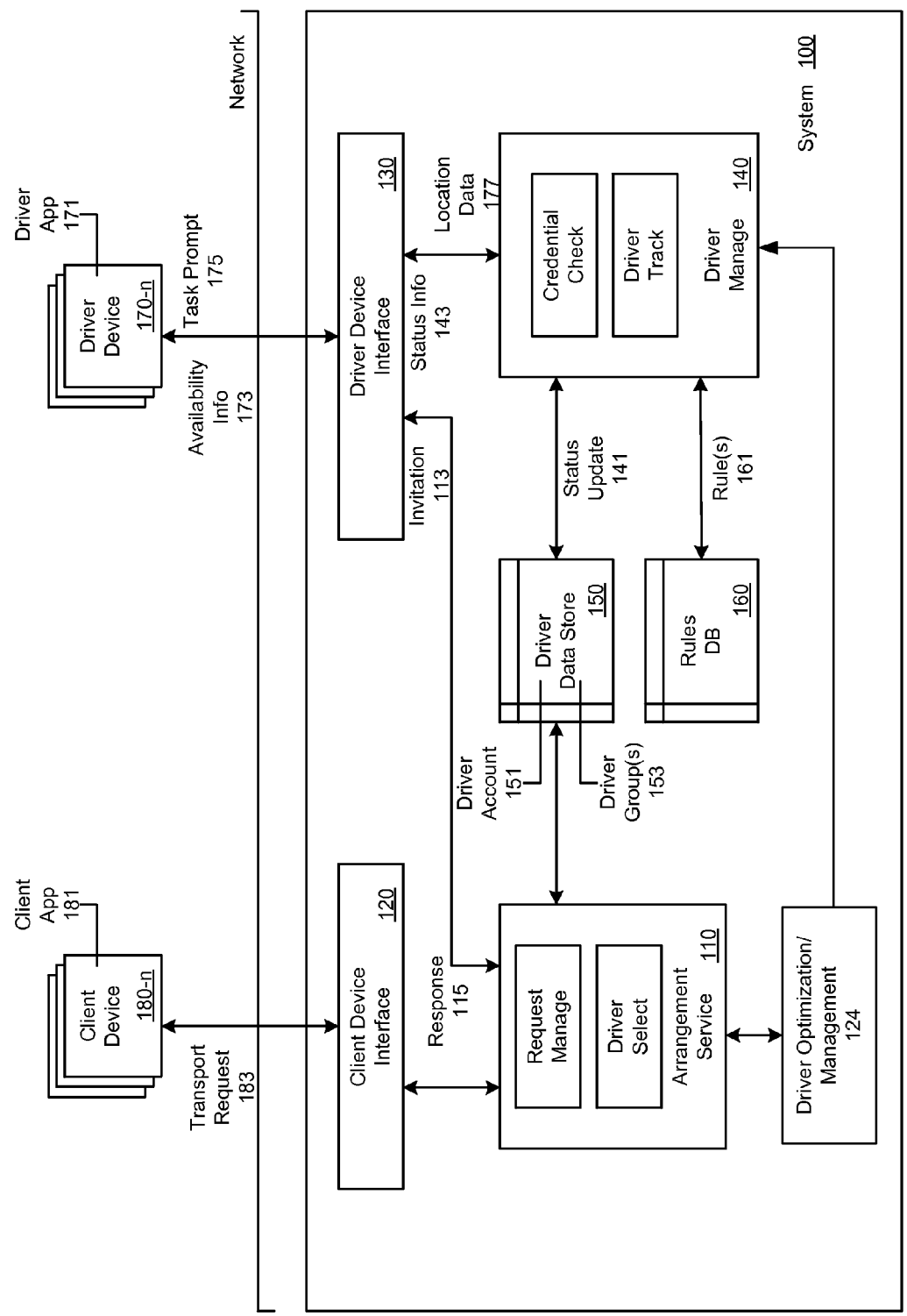
FIG. 1 illustrates an example system to enable a service provider to provide on-demand services based on the completion of a task.

Examples described herein provide for a transport service arrangement system that enables drivers to provide transport services using a platform provided by the system when the drivers comply with specified requirements. For example, the system can determine that a driver is capable of providing transport services based on the driver completing a specified task. As described herein, a driver can be deemed capable if the system determines that the driver can receive an invitation to provide a transport service. The driver's completion of the task can verify that the driver wants to use the platform to provide transport services.

In some examples, the system can receive, from a driver device, information indicating that a driver operating the driver device is available to provide transport services. For example, the driver can operate a service application that is stored on the driver device and communicates with the system. In response to receiving the information, the system can cause the service application to display a prompt instructing the driver to perform a task. The system can detect whether the driver completed the specified task based on location information received from the driver device.

When the system determines that the driver has completed the specified task, the system can classify the driver as being capable of providing transport services, and thereby enable the service application to potentially receive invitation(s) for transport service from the system. In other words, once the system classifies the driver as being capable of providing transport services, the system can include that driver in a group of drivers that the system can select from to provide a transport service for a requesting user.

According to an example, the service application can receive a communication or message from the system to cause the service application to display the prompt. The service application can also periodically determine the location of the driver device and periodically transmit location information (e.g., a location data point) to the system. As referred to herein, the location of a driver, the location of the driver device, or a location data point can each correspond to a coordinate of a geographic coordinate system, such as a latitude and a longitude coordinate. Such a location data point can be determined from a global positioning system (GPS) component or receiver of a computing device, such as the driver device. Depending on implementation, the service application can periodically transmit a location data point corresponding to the location of the driver device in response to the service application being launched on the driver device, can periodically transmit the location data point in response to displaying the prompt, and/or can periodically transmit the location data point in response to receiving the communication from the server. The system can use the received location data to determine whether the driver has properly completed the requisite task.

For example, the prompt can instruct the driver to wait for a predetermined duration of time (e.g., one minute or two minutes) before starting to travel from the driver's current location. The system can determine whether the driver has waited for the predetermined duration of time at a particular location based on each of the location data points (provided by the driver device) being within a predefined distance of each other. In another example, the prompt can instruct the driver to travel to a predetermined location data point(s) (e.g., drive to or through a particular street intersection). Based on the received location data point(s), the system can determine whether the driver has traveled to the specified location or to a location that is within a predefined distance of the predetermined location data point.

Still further, in another example, the system can also classify the driver as being capable of providing a transport service, such as in the manner described above, but also determine whether the driver has been inactive for a predetermined duration of time (e.g., twenty minutes). The system can determine that the driver has been inactive for the predetermined duration of time if the driver has not provided transport service for any user during the predetermined duration of time, if the driver rejected a specified number of invitations for transport service during the predetermined duration of time, and/or if driver has not traveled more than a predetermined distance from a start location. In another example, the system can determine that the driver has been inactive based, at least in part, on a state of the service application on the driver device. The start location can correspond to the location of the driver device when the system received information indicating that the driver is available to provide transport services or when the system previously classified the driver as being capable of providing a transport service.

If the system determines that the driver has been inactive for the predetermined duration of time, the system can classifying the driver as being incapable of providing a transport service, and cause the service application to display a prompt instructing the driver to perform a task. The system can then again determine whether the driver has completed the task in order to re-classify the driver as being capable of providing a transport service. In this manner, the system can continue to repeat this process to verify that the driver wants to use the platform to provide transport services.

According to some examples, in response to detecting the completion of the task, the system can classify the driver as being capable of providing a transport service by adding an identifier associated with the driver to a group of identifiers of other drivers, and also record the time when the task was completed and a location where the task was completed in a driver account of the driver. Such time and the location information can be useful for tracking or monitoring when and where the driver was at the time the driver became capable of providing a transport service (e.g., became active on the platform of the system so that the system can select the driver to perform a transport service for a user). The system can use this information for different purposes, such as to determine the behaviors or habits of drivers for purposes of determining supply at particular geographic regions or times. In other examples, the system can use this information to determine when automobile insurance coverage has begun for individual drivers using the platform and where the drivers were when automobile insurance coverage has begun.

For example, an entity that implements the transport service arrangement system can provide automobile insurance coverage, e.g., via the entity or an insurance company that provides coverage for the entity, for drivers that use the platform (and the service application) provided by the entity to provide transport services. In one example, the entity can provide automobile insurance coverage for a driver even when the driver is not providing a transport service (e.g., has not picked up a user or rider of the system), but is still available to provide transport services for users of the system. Among other benefits and technical effect, by monitoring information associated with a driver, such as by communicating with a driver device or service application through secure communication channels, the system can determine what the state of that driver should be with. In addition, by causing a driver to complete a task before initiating automobile insurance coverage for the driver, the driver can be prevented from improperly using the service application (e.g., keeping the service application open on the driver device) to obtain automobile insurance coverage when the driver is, in fact, not providing or attempting to provide transport service to users of the system. Still further, by causing a driver to complete a task before initiating automobile insurance coverage for the driver, the driver can be prevented from launching the service application to obtain automobile insurance coverage from the entity after the driver gets into an accident, for example, while personally using the driver's vehicle.

As used herein, a client device, a driver device, a computing device, and/or a mobile device refer to devices corresponding to desktop computers, cellular devices or smartphones, personal digital assistants (PDAs), laptop computers, tablet devices, etc., that can provide network connectivity and processing resources for communicating with the system over one or more networks. Client devices and driver devices can each operate a designated service application (e.g., a client application and a driver application, respectively) that is configured to communicate with the transport service arrangement system. A driver device can also correspond to a computing device that is installed in or incorporated with a vehicle, such as part of the vehicle's on-board computing system.

Still further, examples described herein relate to a variety of on-demand services, such as a transport service, a food truck service, a delivery service, an entertainment service, etc. to be arranged between users and service providers. In other examples, the system can be implemented by any entity that provides goods or services for purchase through the use of computing devices and network(s).

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system to enable a service provider to provide on-demand services based on the completion of a task. According to an example, a transport service arrangement system 100 includes an arrangement service 110, a client device interface 120, a driver device interface 130, a driver manage 140, a driver data store 150, and a rules database 160. A plurality of driver devices (e.g., service provider devices) 170 and a plurality of client devices 180 can communicate with the system 100 over one or more networks using, for example, respective designated service applications that are configured to communicate with the system 100. The components of the system 100 can combine to determine when a driver should be prompted to complete a task and/or to determine when a driver is capable of providing transport services based on the driver completing a specified task. Logic can be implemented with various applications (e.g., software) and/or with hardware of a computer system that implements the system 100.

Depending on implementation, one or more components of the system 100 can be implemented on network side resources, such as on one or more servers. The system 100 can also be implemented through other computer systems in alternative architectures (e.g., peer-to-peer networks, etc.). As an addition or an alternative, some or all of the components of the system 100 can be implemented on client devices, such as through applications that operate on the client devices and/or the driver devices. For example, a driver service application 171 and/or a client service application 181 can execute to perform one or more of the processes described by the various components of the system 100. The system 100 can communicate over a network, via a network interface (e.g., wirelessly or using a wireline), to communicate with one or more driver devices 170 and one or more client devices 180.

The system 100 can communicate, over one or more networks, with driver devices 170 and client devices 180 using a driver device interface 130 and a client device interface 120, respectively. The device interfaces 120, 130 can each manage communications between the system 100 and the respective computing devices. The driver devices 170 and the client devices 180 can individually operate driver service applications 171 and client service applications 181, respectively, that can interface with the device interfaces 130, 120 to communicate with the system 100. According to some examples, these applications can include or use an application programming interface (API), such as an externally facing API, to communicate data with the device interfaces 120, 130. The externally facing API can provide access to the system 100 via secure access channels over the network through any number of methods, such as web-based forms, programmatic access via restful APIs, Simple Object Access Protocol (SOAP), remote procedure call (RPC), scripting access, etc.

The system 100 can provide a network service to enable users (e.g., riders) to make requests for transport services using their client devices 180 and to enable drivers to receive invitations for transport services on their driver devices 170. According to some examples, when the entity that implements the system 100 authorizes a driver as being an eligible driver (e.g., one that can use the platform), the system 100 can store an account associated with the driver in a driver data store 150. Eligible drivers can be allowed to operate a driver service application 171 (also referred to herein as a driver application) on the driver's device 170 to communicate with the system 100 for purpose of receiving invitations for transport services. In addition, while only one driver device 170 is described in the example of FIG. 1 for purpose of simplicity, the system 100 can concurrently communicate with multiple driver devices 170 in the manner described below.

When a driver is ready to provide transport services (e.g., is ready to pick up and drop off users), the driver can launch or open the driver application 171 on the driver device 170. For example, the driver can first select an icon for the driver application 171 on the driver device 170 and/or log in or sign in using his or her credentials. When the driver application 171 is launched, the user interface of the driver application 171 can be displayed, in full screen or in prominence, on the display of the driver device (e.g., is on the foreground of the display). Depending on implementation, in response to the driver application 171 being launched, the driver application 171 can provide a communication or a message, over one or more networks, to the driver device interface 130 indicating that the driver application 171 has been launched. The driver application 171 can also include in the communication, or transmit with the communication, other information associated with the driver or the driver device 170 (e.g., referred to herein as driver information). For example, the driver information include the driver identifier (ID), a token based on or associated with the driver's credentials (e.g., a username, a user ID, a password, etc.), a location data point corresponding to the location of the driver device 170 when the driver application 171 was launched, information about the device operating system, information about the device model, a serial number associated with the driver device 170, etc.

The credential check component of the driver manage 140 can use at least some of the received driver information to identify the driver account 151 corresponding to the driver and/or the driver device 170 from the driver data store 150. For example, the credential check component can use the token, the driver ID, and/or the serial number associated with the driver device 170 to determine whether the driver operating the driver device 170 is an eligible driver that can use the system 100. The credential check component can compare the received information, which is associated with the driver or the driver device 170, with stored information in the driver data store 150. If the driver is an eligible driver, the credential check component can identify the driver's account 151 in the driver data store 150.

According to one example, the launching of the driver application 171 can be indicative of the driver's willingness and availability to provide transport services. In such an example, the driver manage 140 can receive information that the driver application 171 has been launched, which can indicate that the driver is available to provide transport services (e.g., referred to herein as availability information 173). In another example, after the driver application 171 is launched, the driver application 171 can display a selectable feature (e.g., "Go Online" feature) on a user interface of the driver application 171. The driver can select this feature, via user input, to indicate to the system 100 that the driver is available to provide transport services. In this example, the driver manage 140 can first receive information that the driver application 171 has been launched, and then receive the availability information 173 in response to the driver selecting the selectable feature. The driver application 171 can also provide the current location of the driver device 170 in response to the driver selecting the selectable feature. In either implementation, in response to receiving the availability information 173, the driver manage 140 can record, in the driver's account 151, the time when the availability information 173 was received and the location of the driver device when the availability information 173 was received.

According to an example, when the driver manage 140 receives the availability information 173, the driver manage 140 can cause the driver application 171 to display a prompt instructing the driver to perform a specified task. In one example, when the driver manage 140 receives information that the driver application 171 has been launched or receives information that the driver has selected the "Go Online" feature to indicate availability, the driver manage 140 can transmit data corresponding to the prompt to the driver device 170 (e.g., task prompt data 175). The task prompt data 175 can be stored in the driver device 170 and can cause the driver application 171 to display the corresponding prompt when the driver selects the selectable feature to indicate his or her availability to provide transport services. In other examples, the task prompt data 175 can be preprogrammed or pre-stored with the driver application 171, so that the task prompt data 175 for one or more different prompts is resident on the driver device 170 (e.g., downloaded on the driver device 170 when the driver application 171 and/or different versions of the driver application 171 are downloaded on the driver device 170). In such case, the driver manage 140 can trigger the driver application 171 to display a specified prompt using at least some of the pre-stored task prompt data 175. Still further, in another example, when the driver manage 140 receives the availability information 173 as a result of the driver selecting the selectable feature, the driver manage 140 can transmit the task prompt data 175 to the driver device 170, which can cause the driver application 171 to display the corresponding prompt. The driver manage 140 can determine what prompt to be displayed on the driver device 170 based on a selected task for the driver.

In some examples, the driver manage 140 can access a rules database 160 to determine which task the driver is to complete and which instructions to provide to the driver device 170. The rules database 160 can store a plurality of rules 161 that can be created, edited, and/or deleted by one or more administrative users of the system 100. For example, an administrative user can operate a user interface or portal provided by the system 100 (not shown in FIG. 1) to enable the administrative user to manage the rules database 160. Depending on implementation, a rule 161 can specify a task to be completed, a particular driver or a group of drivers that is to perform the task, parameters of the task (e.g., a time parameter(s) and/or a location parameter(s), etc.), a location or geographic region applicable for the task, and/or textual information to instruct the driver. For example, in response to receiving the availability information 173, the driver manage 140 can determine one or more rules 161 that is applicable to the driver and/or the real-time conditions, based on the received driver information and/or the location of the driver. The driver manage 140 can cause the service application 171 to display a particular prompt instructing the driver to perform a specified task based on the one or more rules 161.

For example, a rule 161 can specify that drivers that are in a particular geographic region and/or that have indicated availability at a particular time of day are to be instructed to travel to a particular location or to multiple locations in a specified sequence or manner (e.g., travel to two street intersections or two location data points) in order to be classified as being capable of providing transport services. The rule 161 can also cause the driver manage 140 to select a particular location, from a plurality of different location options, based on the location of the driver device 170 when or after the availability information 173 of the driver is received. In another example, a rule 161 can specify that each driver of a group of drivers is to wait for a predetermined duration of time in order to be classified as being capable of providing transport services.

After triggering the driver application 171 to display the prompt, the driver manage 140 can track or monitor the driver device 170 to detect, based on information received from the driver device 170, such as inputs from the driver application 171 or location information of the driver device 170, if and when the driver has completed the specified task. According to some examples, the driver application 171 can interface with the GPS receiver of the driver device 170 to receive (e.g., periodically) the current location of the driver device 170 at different instances in time. The driver application 171 can periodically transmit driver information (e.g., a driver ID or a device ID) and/or location information of the driver device 170 to the system 100. For example, depending on implementation, the driver application 171 can periodically transmit driver information and/or location information to the system 100 (i) in response to being launched on the driver device 170, (ii) in response to the driver selecting the selectable feature to indicate that the driver is available to provide transport services, (iii) in response to receiving the task prompt data 175, or (iv) in response to displaying the prompt.

The location information of the driver device 170 (e.g., referred to herein as location data 177) can indicate to the driver track component how the driver is traveling and/or indicate when the driver is stationary for a period(s) of time. The location data 177 can also include, for each GPS location data point, for example, a time stamp for that GPS location data point. In this manner, once the prompt is displayed on the driver device 170, the driver track component of the driver manage 140 can use the location data 177 received from the driver device 170 to determine whether the driver has completed the specified task (e.g., under the assumption that the driver has seen the prompt). According to some examples, the driver track component can also update the individual driver accounts 151 in the driver data store 150 with the location data 177 periodically received from the driver devices 170.

In one case example, the prompt can instruct the driver to wait a predetermined duration of time (e.g., one minute) before moving or traveling from the driver's current location. For example, the driver's current location can correspond to the location of the driver device 170 when the availability information 173 was transmitted by the driver application 171 or when the prompt was displayed by the driver application 171. The driver track component can determine a first time when the availability information 173 was transmitted by the driver application 171 or when the prompt was displayed by the driver application 171 and use the location data 177 periodically received (e.g., every four seconds) from the driver application 171 to determine whether the driver has waited for the predetermined duration of time before traveling from the driver's current location. For example, the driver track component can determine that the driver has waited at least the predetermined duration of time at the driver's current location based on each of at least some of the location data points being within a predefined distance of each other (e.g., to account for GPS error) and/or being within a predefined distance of the driver's current location data point. If the driver track component detects that the driver has completed the task in the required manner, the driver manage 140 can classify the driver as being capable of providing transport services.

In another use case example, the task can correspond to a driver having to travel from the driver's current location to a particular location. The driver manage 140 can determine, based on the driver's current location, one or more candidate location data points for the task. For example, the driver manage 140 can access the rules database 160 using the driver's current location to identify one or more candidate location data points specified by one or more rules 161. The driver manage 140 can then select a candidate location data point that is the closest to or furthest away from the driver's current location (e.g., by point to point distance, by predicted route of travel, by time of travel, etc.) as the target location that the driver is to travel to in order to complete the task. The driver manage 140 can access one or more mapping databases (not shown in FIG. 1) or one or more routing services (not shown in FIG. 1) to select the candidate location data point. In another example, the driver manage 140 can randomly select a candidate data point from the one or more candidate location data points.

The driver manage 140 can cause the driver application 171 to display a prompt that instructs the driver to perform this task. Depending on implementation, the prompt can include the corresponding address of the target location and/or a map showing the driver's current location and the target location. In one example, the prompt can also be interactive, such that when the driver selects the prompt or a selectable feature on the prompt, the driver application 171 can display a map showing the route to the target location or turn-by-turn directions to the target location to guide the driver to complete the task.

The driver track component can periodically receive the location data 177 of the driver device 170 in order to monitor the driver (or the driver device 170). The driver track component can then determine, based on one or more of the received location data points of the driver device 170, whether the driver has traveled to the target location (e.g., to the target location data point). In one example, the driver track component can detect that the driver has traveled to the target location by determining that one or more of the received location data points is within a predefined distance of the target location data point. When the driver track component detects that the driver has completed the task by traveling to the target location, the driver manage 140 can classify the driver as being capable of providing transport services.

Still further, in another use case example, the task can correspond to a driver having to travel from the driver's current location to a particular location in a predetermined manner (e.g., travel to multiple locations in a particular order or sequence). Depending on implementation, the driver manage 140 can determine, based on the driver's current location, (i) one or more sets of candidate location data points predetermined by the system 100 (where each set includes two or more location data points specified in a particular order), or (ii) one or more candidate location data points. In the former example, the driver manage 140 can select a set of candidate location data points that is the closest to or furthest away from the driver's current location based on the predicted route of travel and/or the time of travel. In the latter example, the driver manage 140 can select a candidate location data point that is the closest to or furthest away from the driver's current location (e.g., by point to point distance, by predicted route of travel, by time of travel, etc.) and then dynamically determine at least another location data point that the driver is to travel to. In this manner, the driver manage 140 can identify multiple target locations for the task for the driver.

Similarly, such as described above, the driver manage 140 can cause the driver application 171 to display a prompt that instructs the driver to perform the task. The prompt can include the corresponding addresses of the target locations, the order in which the driver is to travel to the target locations, and/or a map showing the driver's current location and the target locations. In one example, the prompt can also be interactive, such that when the driver selects the prompt or a selectable feature on the prompt, the driver application 171 can display a map showing the route to the target locations or turn-by-turn directions to the target locations to guide the driver to complete the task.

The driver track component can periodically receive the location data 177 of the driver device 170 in order to determine, based on the received location data points of the driver device 170, whether the driver has traveled to the target locations in the specified order. The driver track component can detect that the driver has traveled to the target locations by determining that one or more of the received location data points is within a predefined distance of the individual target location data points. The driver track component can also use the time stamp of those received location data points to determine that the driver traveled to the target locations in the specified order. When the driver track component detects that the driver has completed the task by traveling to the target locations, the driver manage 140 can classify the driver as being capable of providing transport services.

Still further, in some examples, after displaying the prompt, the service application 171 can display different user interface features to indicate to the driver's state or classification. The driver manage 140 can provide textual information to the driver application 171 to notify the driver that he or she is not yet active or that the driver is active because the task has been completed. The driver application 171 can also display the user interfaces in different colors, such as a blinking red semi-transparent overlay of the user interface when the driver is not active, and a flash of green semi-transparent overlay of the user interface when the driver is determined to have completed the task.

As an alternative or an addition, in some other use case examples, the driver track component can determine whether the driver has completed the specified task without using the location data 177. For example, the prompt can instruct the driver to wait a predetermined duration of time (e.g., two minutes). The driver manage 140 can automatically classify the driver as being capable of providing transport services after the predetermined duration of time elapses. In such an example, the driver track component can determine a first time when the availability information 173 was transmitted by the driver application 171 or when the prompt was displayed by the driver application 171, and once the predetermined duration of time elapses from the first time, the driver track component can detect that the task has been completed. In response, the driver manage 140 can then classify the driver as being capable of providing transport services.

According to some examples, the driver manage 140 can classify the driver as being capable of providing transport services by updating the status of the driver in the driver's account 151. The driver manage 140 can perform a status update 141 to change the status of the driver's account 151 accordingly (e.g., in a field in the driver's account 151). The different states of the driver can include one or more of (i) active (which corresponds to the driver capable of providing transport service) (ii) offline or inactive, (iii) available but not active, (iv) in use or currently providing a transport service, (v) suspended, or other states. In addition, when the driver manage 140 detects that the driver has completed the task, the driver manage 140 can also transmit a status information 143 to the driver device 170 to notify or prompt the driver that the driver has completed the task and/or is now active (e.g., capable of providing transport services).

In another variation, the system 100 can maintain individual databases 153 or tables for groups of drivers that are capable of providing transport services (e.g., stored in the driver data store 150 or in other databases not shown in FIG. 1). The databases 153 of groups can be individually maintained based on geographic regions in which the drivers are located. The driver manage 140 can classify the driver as being capable of providing transport services by adding or including the driver ID (or an identifier associated with the driver's account 151) to the database 153 of the group of identifier of other drivers that are capable of providing transport services. By changing the status of the driver's account 151 from "available" to "active," or by adding the driver ID to a group of active drivers, the arrangement service 110 can consider that driver account 151 for selection when processing a transport request.

The driver manage 140 can also record, in the driver's account 151, relevant times and locations for the driver. The driver manage 140 can record the time and location when the driver launched the application, the time and location when the driver was classified as being capable of providing transport services, the time and location when the driver received an invitation for providing a transport service, the time and location when the driver accepted an invitation, etc. Once the driver is classified as being capable of providing transport services, the driver application 171 is enabled to receive an invitation for providing a transport service from the arrangement service 110 (e.g., if the arrangement service 110 were to select that driver to perform a transport service for a requesting user).

For example, users can operate the client devices 180 to request transport services. As an example, when a user operates the client application 181, the user can specify a pickup location and a vehicle type for the transport. The client application 181 can generate and transmit, one or more networks, a transport request 183 to the system 100 via the client device interface 120. The request manage component of the arrangement service 110 can identify the user (e.g., from the user identifier from the transport request 183), the pickup location, and the vehicle type. Based on the pickup location, the driver select component of the arrangement service 110 can access the driver data store 150 (or a database 153 of a group of active drivers in other examples) to select a driver that is classified as being capable of providing transport services. In response to selecting a driver, the arrangement service 110 can transmit an invitation 113 to the selected driver's device 170. The invitation 113 can enable the driver to accept or reject the invitation. Based on the response 115 from the driver (either an acceptance or a rejection), the arrangement service 110 can either monitor the transport service arranged for the requesting user or select another driver to provide the transport service for the requesting user. The arrangement service 110 can also record information about the invitation(s) 113 and/or response(s) 115 with the associated driver account 151 in the driver data store 150.

According to some examples, the driver manage 140 can also monitor the driver (or the driver device 170), after initially classifying the driver as being capable of providing transport service, to determine whether the status of the driver needs to be changed. The driver track component can use the location data 177 and/or the information stored in the driver's account 151, for example, to determine whether the driver has been inactive for a predetermined duration of time (e.g., fifteen minutes) since classifying the driver as being capable of providing a transport service. For example, a driver can be determined to be inactive if the driver (i) has not provided transport service for any user during the predetermined duration of time, (ii) has rejected a specified number of invitations for transport service during the predetermined duration of time, (iii) has been stationary for the predetermined duration of time, or (iv) or has not traveled more than a predetermined distance from a previous location. A previous location can correspond to, for example, the location of the driver device 170 when the driver manage 140 received the availability information 173.

In response to determining that the driver has been inactive for the predetermined duration of time, the driver manage 140 can perform a status update 141 to change the status of the driver's account 151 from "active" to "available" or "offline." The driver manage 140 can also cause the driver application 171 to display a prompt instructing the driver to perform a task. Depending on implementation, the task can be the same task (but with different parameters, such as a different target location(s) or a different length of time) or can be a different task than one that the driver had to previously complete. Similarly, as described above, the driver would be required to complete the task in order to be classified as being capable of providing transport services. If the driver track component determines that the driver has completed the task, the driver manage 140 can perform a status update 141 to change the status again and re-classify the driver as being capable of providing transport service (e.g., change to "active" state).

According to some examples, the system 100 can use information stored about drivers to determine when automobile insurance coverage has begun for individual drivers. The entity that implements the system 100 can provide automobile insurance coverage for drivers that use the driver application 171 to receive invitations for providing transport services. The entity can provide automobile insurance coverage for a driver when the driver is traveling to pick up a user at a pickup location or when the driver is providing a transport service for the user (e.g., the user is in the driver's vehicle). The entity can even provide automobile insurance coverage when the driver is not providing a transport service, but is capable of providing transport services for users of the system. By instructing a driver to complete a task before classifying the driver as being capable of providing transport services, the system 100 can efficiently ascertain when automobile insurance coverage has been initiated for the driver. Drivers can also be prevented from improperly using their driver applications 171 to obtain automobile insurance coverage when the drivers are not providing or attempting to provide transport service to users of the system. Still further, the driver manage 140 can also provide a message to the driver application 171 to notify that automobile insurance coverage has started (in response to classifying the driver as being capable of providing transport services).

As an addition or an alternative, the system 100 can operate in one of multiple modes. In a first mode, for example, the driver manage 140 can automatically classify all drivers as being active once the driver manage 140 receives the availability information 173 from the respective driver devices (e.g., in response to the drivers selecting the "Go Online" feature). In a second mode, the driver manage 140 can cause one or more drivers (but not all drivers) to complete a task before being classified as being active, while other driver(s) can automatically be classified as being active when the driver selects the "Go Online" feature, or can cause all drivers to complete a task before being classified as being active. The driver manage 140 can operate in different modes based on the rule(s) 161 and/or based on input provided by administrative user(s) of the system 100.

With respect to examples described with FIG. 1, the driver's performance of tasks and other duties can be securely and remotely monitored to ensure the driver is in compliance with rules and objectives of the service. For example, the driver's timeliness and location can be detected and subjected to an optimization process or criteria in order to enable the service to meet transport demand (e.g., surge of requests) or queued tasks. With these objectives, the service can optimize by prioritizing the tasks or service jobs at hand on behalf of the driver. The optimization can be done without disclosing information to the driver that may otherwise enable the driver to "game" (e.g., act selfishly in terms of tasks/jobs) the assignments. For example, the driver may not have access to information about a next assignment, or even specifics about completing the current assignment so that he does not have opportunity to change routes or decline a job/task.

Still further, any of the examples provided with FIG. 1 can be furthered with global optimization considerations. For example, a driver optimization/management component 124 can operate to implement an optimization process which balances the interest of service providers (e.g., drivers) with those of the users. To balance the interests of the drivers and riders, the system 100 can implement a set of rules, such as provided through the driver optimization/management component 124. The driver optimization/management component 124 can output weights, or parameters, which influence selection or implementation of driver selection and/or implementation of rules 161 from the rule database 160. In operation at a given region, the driver optimization/management component 124 can receive input from multiple users (or potential users) at the given location, including location information. The driver optimization/management component 124 can also receive input from numerous drivers in the same region, including each driver's location and status. The information can be received from the users and drivers in real-time, and decisions (e.g., weights) can be determined through automation and programming in order to ensure individual drivers are selected or assigned for tasks and riders in a manner in which a global optimization objective is met.

A global objective can best be implemented through system 100 operating as an intermediary, thus individual drivers and users may be precluded from viewing information about personal assignments. Moreover, the communications with system 100 can be secure and private, so that the input to the driver optimization/management component 124 does not result in information about users/drivers being disclosed to other users/drivers. Such precautions ensure the information received by the driver optimization/management component 124 is authentic and not unfairly skewed towards one driver or rider as the case may be.

In an example of FIG. 1, the real-time communication with the drivers and riders can include processes which obtain and analyze GPS information. The monitoring of such information provides an example of the manner in which automation/programming can serve a function and purpose which would not otherwise be available through a manual process. Specifically, multiple devices of many drivers and users can be monitored for position information to determine real-time decisions which serve a global objective. A global objective which accounts for the objective of the group, rather than a specific user (e.g., an instantaneous decision for a user, such as closest driver), can only serve a global optimization objective when such information is determined through continuous and programmatic monitoring of active drivers and users, such as provided with GPS monitoring of devices of drivers and users.

Methodology

Figure 2A:
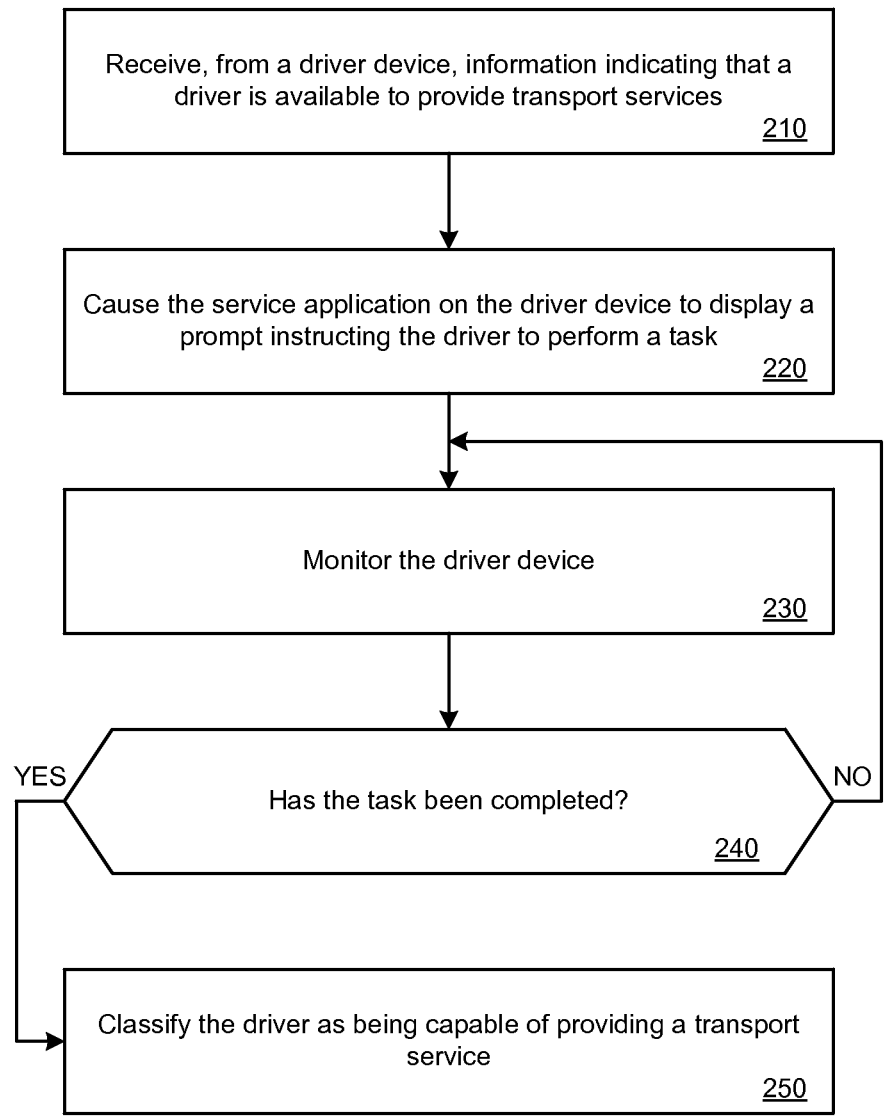
FIGS. 2A and 2B illustrate example methods for classifying a driver as being capable of providing transport services.
Figure 2B:
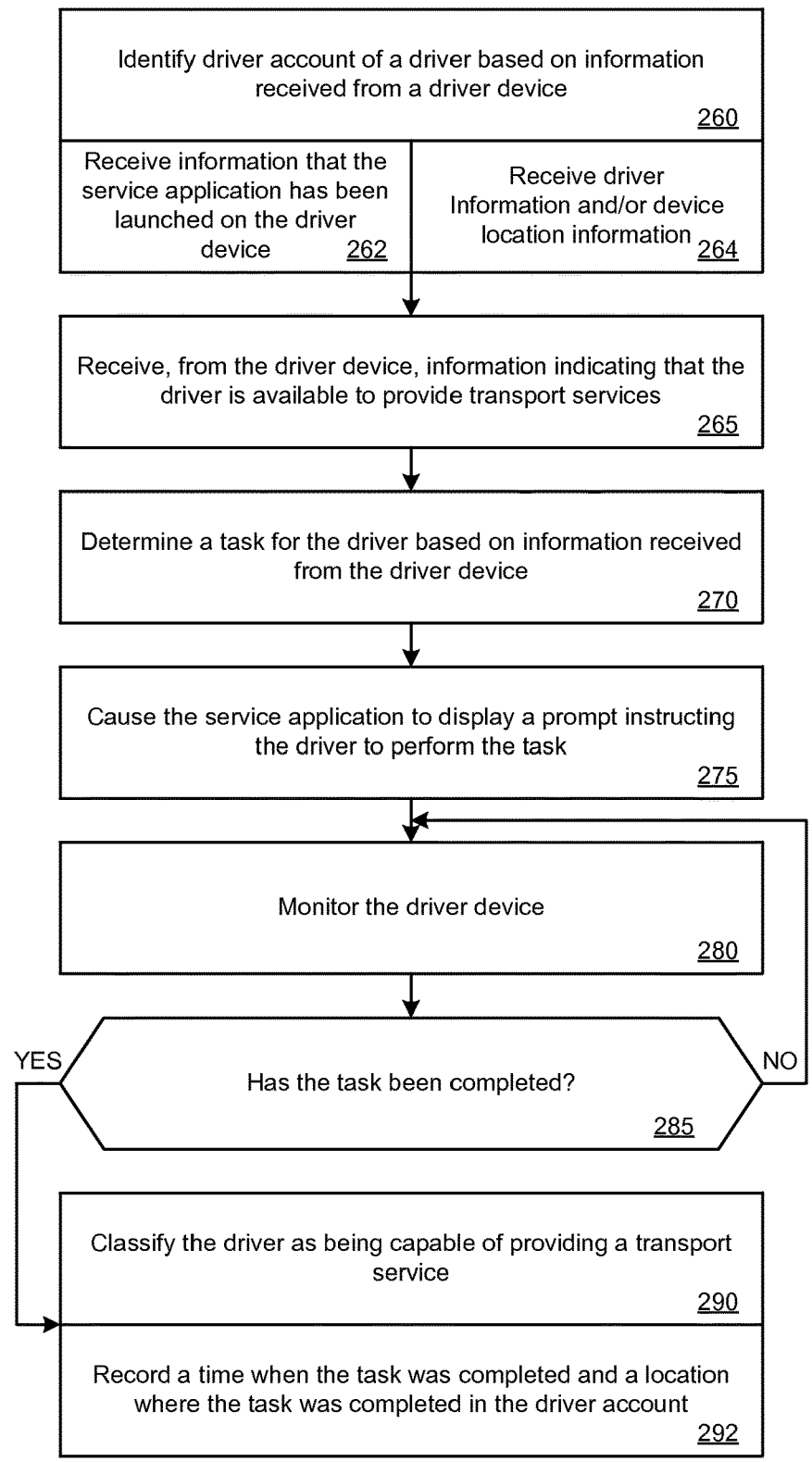

FIGS. 2A and 2B illustrate example methods for classifying a driver account as being capable of providing transport services. Methods such as described by examples of FIGS. 2A and 2B can be implemented using, for example, components described in FIG. 1. Accordingly, references made to elements of FIG. 1 are for purposes of illustrating a suitable element or component for performing a step or sub-step being described.

In FIG. 2A, the system 100 can receive, from a driver device, information indicating that the driver operating the driver device is available to provide transport services (e.g., availability information) (210). The driver can operate a driver application on the driver device, which can exchange data with the system 100 via one or more networks (e.g., cellular network). The driver application can enable the driver to receive invitations for transport services from the system 100. In one example, the driver application can transmit information about the driver application being launched on the driver device or transmit information about the driver selecting a selectable feature to "Go Online," which the system 100 can interpret as the driver indicating his or her willingness to provide transport services.

In response to receiving information indicating that the driver is available to provide transport services, the system 100 can cause the driver application to display a prompt (220). The prompt can instruct the driver to perform a specific task. According to some examples, the prompt can include textual information describing the task and/or other graphic features associated with the task (e.g., images or a map). The task can correspond to an action or a set of actions that the driver has to complete in order for the driver to be classified as being active on the system 100 and capable of providing transport services. In some examples, the task can be a location-based task, in which the driver's location is relevant to the determination of whether the task has been completed.

The system 100 can monitor the driver device by periodically receiving information from the driver device (230). In different variations, the system 100 can periodically receive information before, after, or in response to causing the service application display the prompt. The information can correspond to driver information (such as described with respect to FIG. 1) and location data corresponding to the location of driver device. The system 100 can continue to monitor the driver device (e.g., track the position of the driver device) in order to determine if the task has been completed (240). For example, the system 100 can determine if the driver has completed the task each time the system 100 receives information from the driver device.

If the system 100 determines that the task has not been completed, the system 100 continues to monitor the driver device. In one example, if a predefined duration of time elapses since the driver application displays the prompt and the task has not been completed, the system 100 can cause the driver application to display a subsequent prompt instructing the driver to complete a task. The task can be the same task or a different task. On the other hand, if the system 100 determines that the task has been completed, the system 100 can classify the driver as being capable of providing transport services (250). The system 100 can access the driver account corresponding to the driver and update the status of the driver account from a previous "inactive" or "offline" state to an "active" state. In this manner, once the system 100 classifies the driver as being capable of providing transport services, the system can enable the driver application to receive invitations to provide transport services.

FIG. 2B is another example of classifying a driver account as being capable of providing transport services based on the completion of a task. In FIG. 2B, the system 100 can identify a driver account of a driver based on information received from the driver device (260). For example, the system 100 can receive information from a driver application operating on the driver device when the driver application is launched on the driver device (262). The system 100 can also receive driver information and/or device location information (264). The driver information can include the driver ID, a token based on or associated with the driver's credentials, information about the device operating system, information about the device model, and/or a serial number associated with the driver device, while the device location information can correspond a location data point of the driver device when the driver application is launched on the driver device.

After the system 100 detects that the driver application has been launched on the driver device, the system 100 can receive, from the driver device, information indicating that the driver is available to provide transport services (e.g., availability information) (265). The system 100 can also update the driver account to change the status of the driver to a state indicating the driver's availability (but not yet capable of providing transport services). In some examples, the driver application can display a selectable feature that the driver can select to notify or indicate to the system 100 that the driver is available to provide transport services. In response to the driver input via the selectable feature, the driver application can transmit the availability information to the system 100. Still further, depending on implementation, the driver application can also transmit the location of the driver device when the driver selects the selectable feature, and/or the driver application can periodically transmit at least some of the driver information and the location of the driver device to the system 100.

The system 100 can determine, based on one or more rules or settings of the system 100, that drivers are to perform a task before being able to receive invitations for providing transport services. Depending on the one or more rules, the system 100 can determine that a location-specific task is to be completed by the driver in order to be classified as being capable of providing transport services (e.g., as opposed to a time-specific task). According to one example, the system 100 can determine a task for the driver based on information received from the driver device (270). For example, a task can correspond to a driver having to (i) wait at a location for a predetermined duration of time, (ii) travel to a target location, or (iii) travel to multiple target locations and/or in a specified order or sequence. For a task in which a driver has to travel to one or more target locations, the system 100 can determine the target location(s) based on the location of the driver device (e.g., the location of the driver device when the driver selected the selectable feature).

Figure 3A:
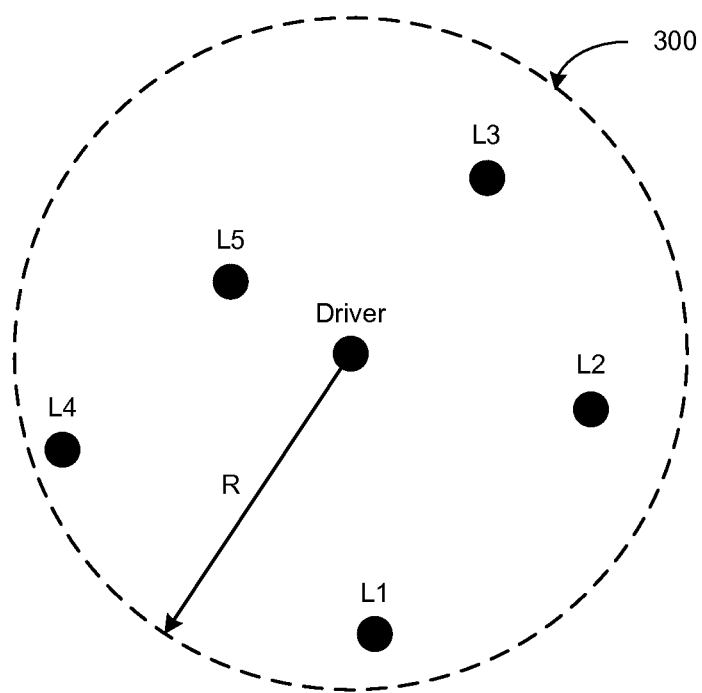
FIGS. 3A and 3B illustrate diagrams for selecting a location for a specified task for a driver.
Figure 3B:
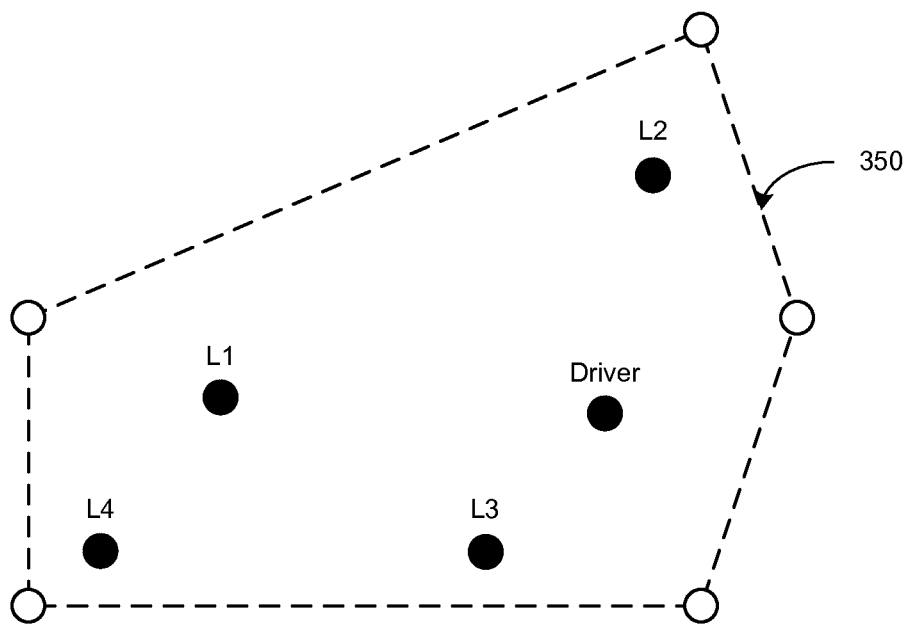

For example, FIGS. 3A and 3B illustrate different diagrams depicting how the system 100 can dynamically select a target location for a task. In the examples of FIGS. 3A and 3B, the system 100 can determine one or more candidate location data points based on the location of the driver device. The location of the driver device can correspond to, for example, (i) the driver's location when the system 100 received the availability information from the driver device, or (ii) the most recent driver's location received by the system 100 at the time the system 100 determines the task for the driver.

In one example, such as illustrated in FIG. 3A, the system 100 can use a predefined radius, R, to identify a region 300 based on the location of the driver device. In this example, the system 100 can determine the region 300 by identifying a circumference of the region 300 using the radius, R, from the location of the driver device being in the center of the region 300. The system 100 can then determine candidate location data point(s) within the region 300. In FIG. 3A, the system 100 has identified five candidate location data points in the region 300 that can be used as a target location for performance of a task (L1 through L5). The candidate location data points can be pre-determined and stored in a database of the system 100.

In another example, the system 100 can identify a pre-defined geographic region to determine one or more candidate location data points for a task for a driver. The system 100 can store a plurality of geographic regions in a database, with each geographic region being identified by three or more location data points that define the perimeter of that geographic region. The system 100 can associate or store one or more candidate location data points with each of the geographic regions. In the example of FIG. 3B, the system 100 has identified a geographic region 350 based on the location of the driver device being positioned in that geographic region 350. The system 100 has identified four candidate location data points in the region 350 that can be used as a target location for performance of a task (L1 through L4).

In either examples, the system 100 can select one of the candidate location data points as the target location that the driver is to travel to in order to complete a location-based task (e.g., based on one or more rules or parameters of the system 100). For example, referring to FIG. 3A, depending on implementation, the system 100 can select the candidate location data point that is closest to the location of the driver device (i.e., L5), the candidate location data point that is furthest from the location of the driver device (i.e., L4), or the candidate data point that is easiest for the driver to travel to based on the mapping information of the region 300 (L2 in this example). The system 100 can use the selected candidate location data point as the target location for the task.

Referring back to FIG. 2B, the system 100 can cause the driver application to display a prompt instructing the driver to perform the determined task (275). The system 100 can transmit data corresponding to the prompt to the driver device or trigger pre-stored data corresponding to the prompt to be used by the driver application. Such a prompt can be displayed as part of a user interface of the driver application, as an in-application message, or as a notification displayed by the driver device. In some examples, the prompt can include textual information to explain the task that the driver is to complete and/or can include a map or image(s) corresponding to the task. The map can include, for example, a graphic indicator for the current location of the driver device, a graphic indicator the target location(s), and/or graphic line(s) showing the determined route for the driver to travel.

Once the system 100 causes the driver application to display the prompt, the system 100 can monitor the driver device (280) and based on information received from the driver device, determine if the task has been completed (285). The system 100 can periodically receive information driver information and location data corresponding to the location of driver device. Based on the determined task and the received information, the system 100 can determine if the driver has completed the task properly.

If the task has not been completed, the system 100 continues to monitor the driver device (continue step 280). On the other hand, if the system 100 determines that the task has been completed, the system 100 can classify the driver as being capable of providing transport services, such as described with FIGS. 1 and 2A (290). The system 100 can mark or indicate in the driver's account the updated status of the driver (e.g., from "available" to "active"). In addition, in some examples, the system 100 can also record the time when the task was completed and the location of the driver when then the task was completed in the driver's account (292). By recording the time and the location when an individual driver was classified as being capable of providing transport service, the system 100 can maintain information of drivers for purposes of determining the behaviors or habits of drivers or determining when automobile insurance coverage has started for drivers.

In addition, the system 100 can also determine the time and the location when an individual driver indicates that he or she is no longer available to provide transport services (e.g., by selecting a "Go Offline" feature on the driver application). The system 100 can receive information that the driver closed the driver application or that the driver has selected the "Go Offline" feature, and determine the time and location of the driver when this information is received or the most recent driver's location received by the system 100 at the time the system 100 receives this information. By keeping a record for the durations of time when the drivers are active and using the platform, the system 100 can enable administrative users of the system 100 to efficiently ascertain when a particular driver was provided automobile insurance coverage and when the driver was not (e.g., for purpose of investigating accidents).

Figure 4:
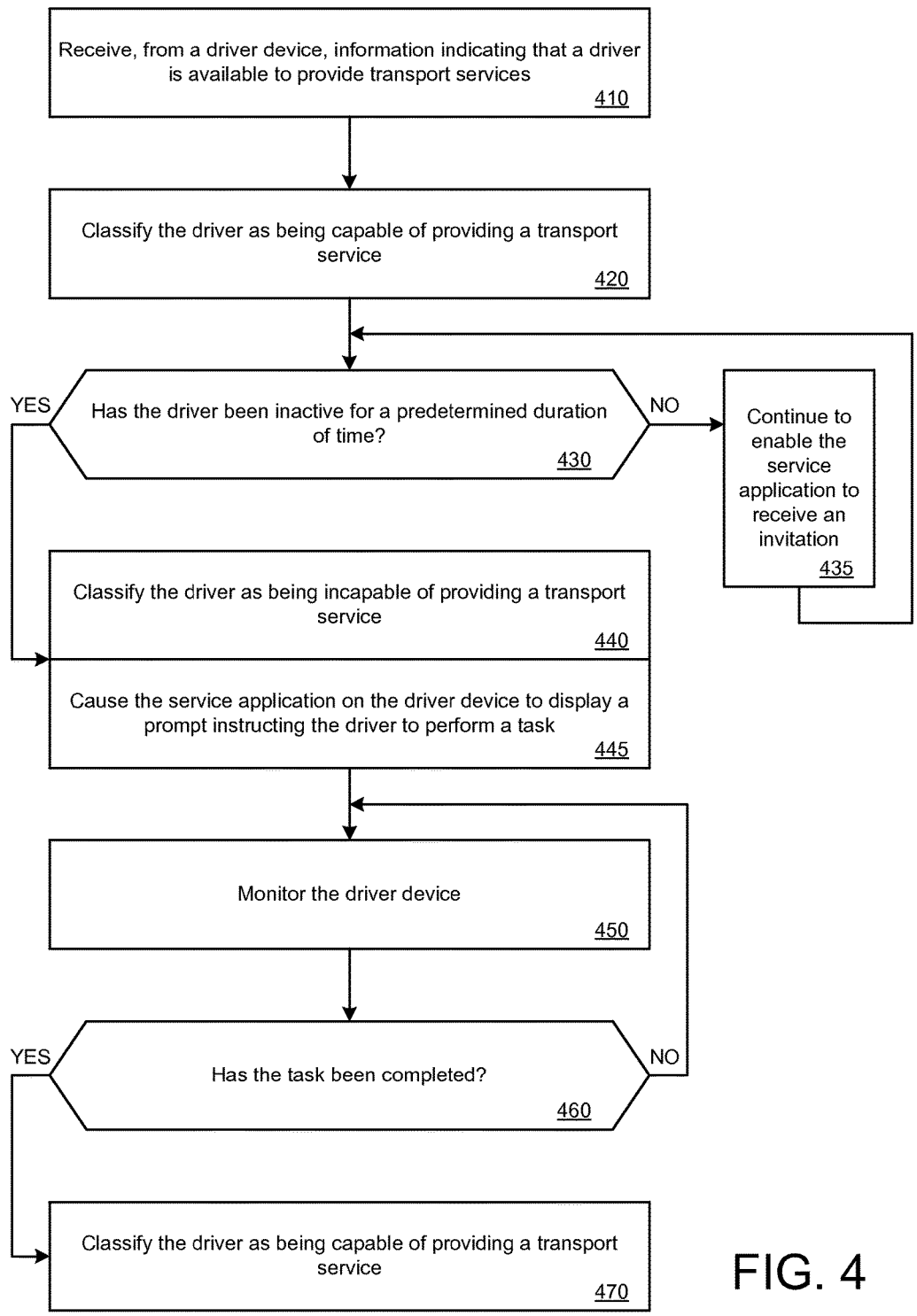
FIG. 4 illustrates an example method for classifying a driver as being capable of providing transport services after a duration of inactivity.

FIG. 4 illustrates an example method for classifying a driver as being capable of providing transport services after a duration of inactivity. A method such as described by an example of FIG. 4 can be implemented using, for example, components described in FIG. 1. Accordingly, references made to elements of FIG. 1 are for purposes of illustrating a suitable element or component for performing a step or sub-step being described.

The system 100 can receive, from a driver device, information indicating that a driver operating the driver device is available to provide transport services (e.g., availability information), such as described in FIGS. 1 through 2B (410). The system 100 can identify the driver's account from a driver data store of the system 100. Based on the driver completing a task, such as described in FIGS. 1 through 2B, in one example, the system 100 can classify the driver as being capable of providing transport services (420). As an addition or an alternative, in some examples, the system 100 can initially classify the driver as being capable of providing transport services when the driver opens the driver application, logs in, and/or indicates that he or she would like to go online or go on duty (e.g., by selecting a selectable feature on the driver application). The system 100 can update a status in the driver's account as being "active" and record the time and the location of the driver when the driver was classified as being active. For example, a driver may have launched the driver application on her device for the first time on a given day, seen the prompt displayed by the driver application to perform a task, completed the task, and been notified that the driver is now active and allowed to receive invitations for providing transport services.

As the driver travels and provides transport services while she is active, the system 100 can continue to periodically receive driver information and/or location information of the driver. The system 100 can also determine the status of the driver, such as whether the driver has been given any invitations for transport services or whether the driver has rejected the invitations (e.g., invitation information). The system 100 can determine if the driver has been inactive for a predetermined duration of time (e.g., twenty minutes) using at least some of the received information or invitation information (430). The duration of inactivity can correspond to a length of time since the driver was classified as being active, since the driver last provided a transport service, since the driver last received an invitation and/or provided a response, since the driver last changed positions, etc. Depending on variations, the system 100 can determine that the driver has been inactive for the predetermined duration of time if the driver has not provided transport service for any user during the predetermined duration of time, if the driver rejected a specified number of invitations for transport service during the predetermined duration of time, and/or if driver has not traveled more than a predetermined distance from a location.

In another example, the system 100 can determine that the driver has been inactive for a predetermined duration of time from when the driver minimizes the driver application or places the driver application in the background (so that the user interface of the driver application is not displayed on the display of the driver device). When the driver application is in the background as opposed to the foreground, the driver is not actively interacting with the driver application (e.g., is not viewing content or providing user input on the user interface of the driver application), but may nonetheless have not changed the status from "on duty" to "off duty," for example. For example, if the system 100 determines that a predetermined duration of time has elapsed in which the driver had indicated that he or she was available (e.g., "on duty") and the state of the application is in the background or minimized state, the system 100 can determine that the driver has been inactive for the predetermined duration of time.

If the driver has not been inactive for a predetermined duration of time, the system 100 can enable the driver to remain active so that the driver application can continue to receive invitations for transport services (435). On the other hand, if the system 100 determines that the driver has been inactive for a predetermined duration of time, the system 100 can classify the driver as being incapable of providing transport services (440) and update the status of the driver's account from being "active" to another state, such as "inactive" or "available." In addition, the system 100 can cause driver application to display a prompt instructing the driver to perform a task (445). The prompt can correspond to a task the driver previously performed or can correspond to a different task with different parameters than the previous task. For example, the target location for this subsequent task can be different than the target location for the previous task, as a result of the driver's location.

The system 100 can then monitor the driver device (450) and determine if and when the task has been completed (460). When the system 100 detects that the driver has completed this task, the system 100 can then re-classify the driver as being capable of providing transport services (470). The system 100 can then again update the status of the driver account from "inactive" to "active," and also record the time and the location of the driver device when the driver was re-classified as being active. In one example, the system 100 can cause the driver application to display an interactive notification prompting the driver to select a feature (e.g., which corresponds to the task in this example) to be classified as being capable of providing transport. The driver selecting the feature can be indicative of confirming the intent to continue to be "on duty" and provide services.

Hardware Diagrams

Figure 5:
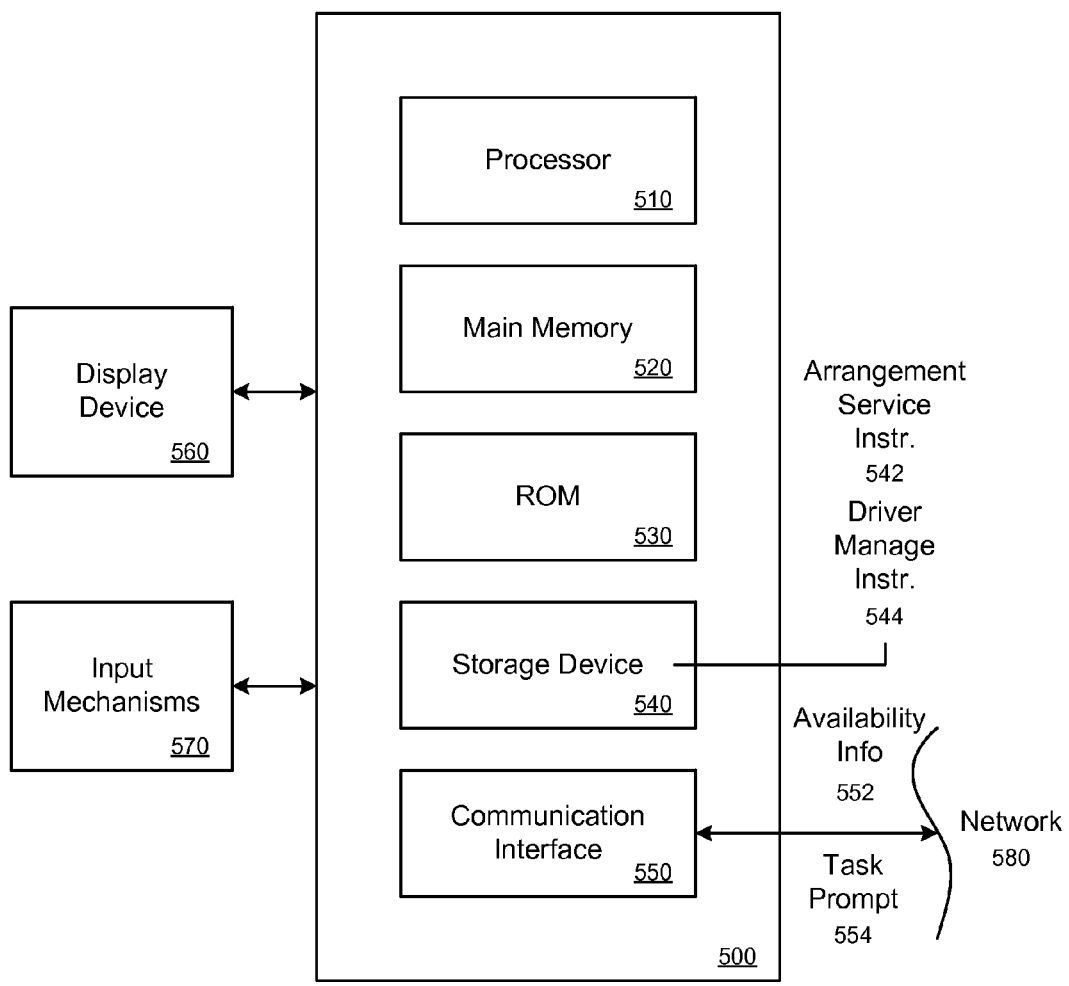
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1, the system 100 may be implemented using a computer system such as described by FIG. 5. The system 100 may also be implemented using a combination of multiple computer systems as described by FIG. 5.

In one implementation, a computer system 500 includes processing resources 510, a main memory 520, a read only memory (ROM) 530, a storage device 540, and a communication interface 550. The computer system 500 includes at least one processor 510 for processing information and the main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions, including arrangement service instructions 542 and driver manage instructions 544.

For example, the processor 510 can execute the arrangement service instructions 542 to implement logic for receiving a request for a transport service and selecting a driver to provide the transport service for the requesting user, such as described in FIGS. 1 through 4. The processor 510 can also execute the driver manage instructions 544 to implement logic for receiving information indicative of drivers' availabilities to provide transport services (e.g., availability information 552), determining tasks that the drivers are to complete, causing prompts to be displayed on driver applications, and detecting if and when the drivers have completed the respective tasks, such as described in FIGS. 1 through 4.

The communication interface 550 can enable the computer system 500 to communicate with one or more networks 580 (e.g., cellular network) through use of the network link. Using the network link, the computer system 500 can communicate with one or more other computing devices, such as driver devices, and/or one or more other servers or datacenters. According to an example, the computer system 500 can receive availability information 552 from individual driver devices (at different instances of time) via the network link. In response to receiving the availability information 552 from a driver device, the computer system 500 can provide, via the network link, task prompt data 554 to cause the driver device to display a prompt instructing the driver to complete a task, as described in FIGS. 1 through 4.

The computer system 500 can also include a display device 560, such as a cathode ray tube (CRT), an LCD monitor, or a television set, for example, for displaying graphics and information to a user. One or more input mechanisms 570, such as a keyboard that includes alphanumeric keys and other keys, can be coupled to the computer system 500 for communicating information and command selections to the processor 510. Other non-limiting, illustrative examples of input mechanisms 570 include a mouse, a trackball, touch-sensitive screen, or cursor direction keys for communicating direction information and command selections to the processor 510 and for controlling cursor movement on the display 560.

Examples described herein are related to the use of the computer system 500 for implementing the techniques described herein. According to one embodiment, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
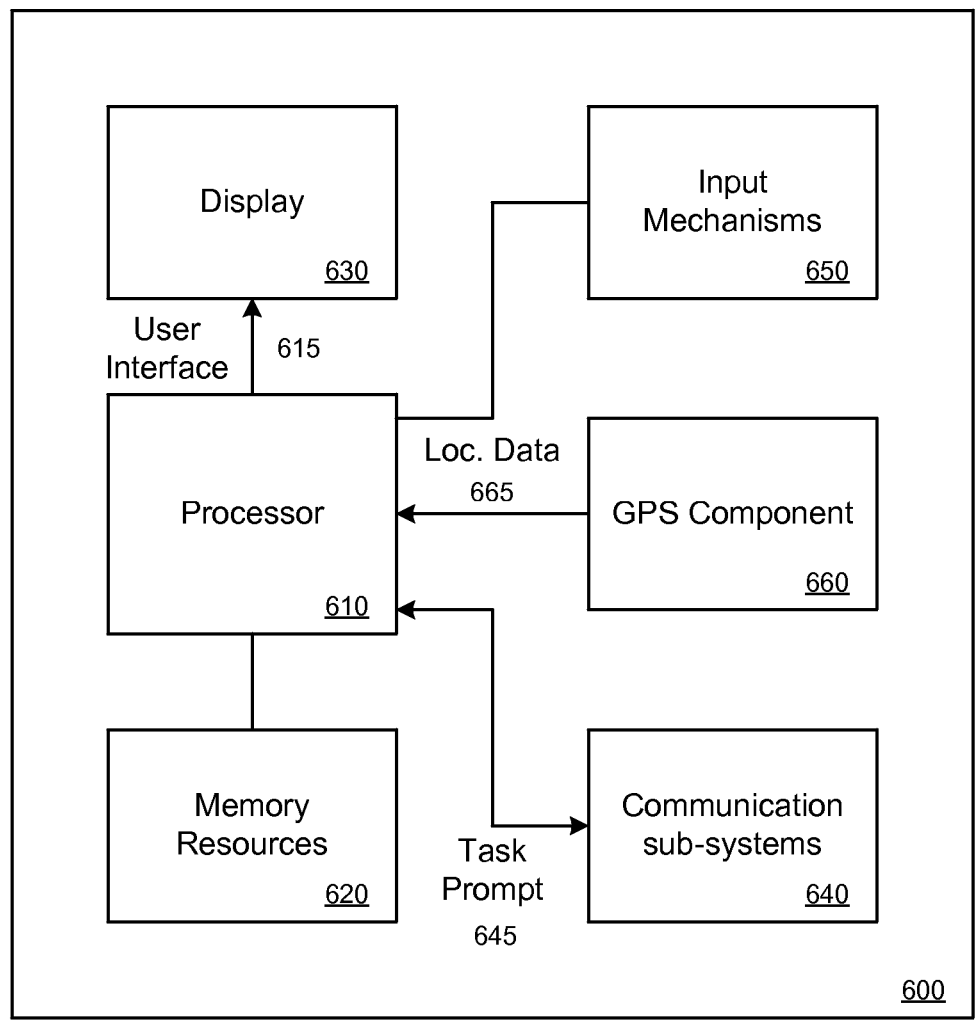
FIG. 6 is a block diagram that illustrates a mobile computing device upon which embodiments described herein may be implemented.

FIG. 6 is a block diagram that illustrates a mobile computing device upon which embodiments described herein may be implemented. In one embodiment, a computing device 600 may correspond to a mobile computing device, such as a cellular device that is capable of telephony, messaging, and data services. The computing device 600 can correspond to a client device or a driver device. Examples of such devices include smartphones, handsets or tablet devices for cellular carriers. The computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more location detection mechanisms (e.g., GPS component) 660. In one example, at least one of the communication sub-systems 640 sends and receives cellular data over data channels and voice channels.

The processor 610 can provide a variety of content to the display 630 by executing instructions and/or applications that are stored in the memory resources 620. For example, the processor 610 is configured with software and/or other logic to perform one or more processes, steps, and other functions described with implementations, such as described by FIGS. 1 through 5, and elsewhere in the application. In particular, the processor 610 can execute instructions and data stored in the memory resources 620 in order to operate a driver application, as described in FIGS. 1 through 5. Still further, the processor 610 can cause one or more user interfaces 615 to be displayed on the display 630, such as one or more user interfaces provided by the driver application.

A driver can operate the computing device 600 to operate the driver application in order to receive invitations for transport services. The driver can interact with the input mechanism 650, such as the touch-sensitive display of the computing device 600, in order to launch the driver application. In some examples, the processor 610 can display a user interface 615 that includes a selectable feature to enable the driver to indicate the driver's availability to provide transport services. In one example, in response to the driver selecting the feature, the processor 610 can transmit the availability information to the transport arrangement system (not shown in FIG. 6) and the processor 610 can receive the task prompt data 645 via the communications sub-systems 640, such as described in FIGS. 1 through 5. The task prompt data 645 can be used to display, on the display 630, a prompt that instructs the driver to perform a task (e.g., as a user interface 615 or as part of a user interface 615). While FIG. 6 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A network computer system comprising:
    a network communication interface to communicate, over one or more networks, with a service application executing on a service provider device of a service provider;
    one or more processors of the network computer system; and
    a memory resource storing a set of rules and a set of instructions, wherein the set of instructions are being executable by the one or more processors to cause the network computer system to:
        monitor, over the one or more networks, the service provider device to obtain location information of the service provider;
        determine, from monitoring the service provider device, that the service provider is inactive for a predetermined period of time;
        classify the service provider as being incapable of providing a transport service based at least on the service provider being determined as being inactive for the predetermined period of time;
        in response to classifying the service provider as being incapable of providing the transport service, prevent the service application from executing on the service provider device to receive any invitations for providing transport services from the network computer system over the one or more networks;
        determine one or more rules from the set of rules that are applicable to the service provider, based on the service provider being classified as incapable;
        select a task for the service provider to perform, based on the determined one or more rules;
        provide, over the one or more networks and to the service provider device, display data to the service application executing on the service provider device to cause the service application to display a prompt instructing the service provider to perform the selected task;
        determine whether the service provider has completed the selected task, based, at least in part, on the location information; and
        in response to determining completion of the selected task, (i) classify the service provider as being capable of providing transport services, and (ii) based on the classification, enable the service application executing on the service provider device to receive an invitation for providing the transport service from the network computer system over the one or more networks.

2. The network computer system of claim 1, wherein the set of instructions, when executed by the one or more processors further cause the network computer system to:
    receive, over the one or more networks and from the service provider device, service provider information that includes one or more service provider or service provider device identifiers;
    receive, over the one or more networks and from the service provider device, information that the service application has been launched on the service provider device and service provider information;
    identify a service provider account associated with the service provider using the service provider information; and
    wherein receiving the service provider information includes receiving the service provider information in response to an input provided by the service provider on the service application indicating that the service provider is available to provide transport services.

3. The network computer system of claim 2, wherein classifying the service provider as being capable of providing the transport service includes adding an identifier associated with the service provider account to a group of identifiers of other service providers, and wherein the service provider device selects one of the identifiers from the group of identifiers of other service providers to process a request for transport from a requester device.

4. The network computer system of claim 1, wherein the location information of the service provider includes one or more location data points of the service provider device.

5. The network computer system of claim 4, wherein the prompt instructs the service provider to wait for a predetermined duration of time, and wherein determining completion of the selected task includes determining that the service provider has waited for the predetermined duration of time at a particular location based on each of the one or more location data points being within a predefined distance of each other.

6. The network computer system of claim 4, wherein the prompt instructs the service provider to travel to a predetermined location data point, and wherein determining completion of the selected task includes determining, based on one or more of the received location data points, that the service provider has traveled to a location data point that is within a predefined distance of the predetermined location data point.

7. The network computer system of claim 4, wherein the prompt instructs the service provider to travel to a predetermined location data point in a predetermined manner, and wherein determining completion of the selected task includes determining, based on a set of the received location data points, that the service provider has traveled to a location data point that is within a predefined distance of the predetermined location data point in the predetermined manner.

8. The network computer system of claim 1, wherein the set of instructions, when executed by the one or more processors, further cause the one or more processors to:
  receive, over the one or more networks and from the service provider device, availability information indicating that the service provider is available to provide transport services;
  in response to receiving the availability information, recording a first time when receiving the availability information and a location of the service provider in a service provider account of the service provider; and
  in response to detecting completion of the selected task, recording a second time when the selected task was completed and a location where the selected task was completed in the service provider account, based on the location information.

9. A non-transitory computer-readable medium storing a set of instructions that, when executed by a processor of a network computer system, causes the network computer system to:
  communicate, using a network connectivity provided by a network communication interface of the network computer system and over one or more networks, with a service application executing on a service provider device of a service provider of a transport service;
  monitor, over the one or more networks, the service provider device to obtain location information of the service provider;
  determine, from monitoring the service provider device, that the service provider is inactive for a predetermined period of time;
  classify the service provider as being incapable of providing the transport service based at least on the service provider being determined as being inactive for the predetermined period of time;
  in response to classifying the service provider as being incapable of providing the transport service, prevent the service application from executing on the service provider device to receive any invitations for providing transport services from the network computer system over the one or more networks;
  determine one or more rules from a set of rules that are applicable to the service provider, based on the service provider being classified as incapable;
  select a task for the service provider to perform, based on the determined one or more rules;
  provide, over the one or more networks and to the service provider device, display data to the service application executing on the service provider device to cause the service application to display a prompt instructing the service provider to perform the selected task;
  determine whether the service provider has completed the selected task, based, at least in part, on the location information; and
  in response to detecting completion of the selected task, (i) classify the service provider as being capable of providing transport services by adding an identifier associated with the service provider to a group of identifiers of other service providers, (ii) record a time when the selected task was completed and a location where the selected task was completed in a service provider account of the service provider, and (iii) enable the service application executing on the service provider device to receive an invitation for providing the transport service from the network computer system over the one or more networks.

10. The non-transitory computer-readable medium of claim 9, wherein the set of instructions, when executed by the processor, further causes the network computer system to:
  receive, over the one or more networks and from the service provider device, service provider information that includes one or more service provider or service provider device identifiers;
  receive, over the one or more networks and from the service provider device, information that the service application has been launched on the service provider device and the service provider information;
  identify the service provider account associated with the service provider using the service provider information; and
  wherein the set of instructions further cause the network computer system to receive the service provider information in response to an input provided by the service provider on the service application indicating that the service provider is available to provide transport services.

11. The non-transitory computer-readable medium of claim 9, wherein the set of instructions, when executed by the processor, further causes the network computer system to:
  select one of the identifiers from the group of identifiers of other service providers to process a request for transport from a user device.

12. The non-transitory computer-readable medium of claim 9, wherein the location information includes one or more location data points of the service provider device.

13. The non-transitory computer-readable medium of claim 12, wherein the prompt instructs the service provider to wait for a predetermined duration of time, and wherein the set of instructions, when executed by the processor, further causes the network computer system to:
  detect completion of the selected task by determining that the service provider has waited for the predetermined duration of time at a particular location based on each of the one or more location data points being within a predefined distance of each other.

14. The non-transitory computer-readable medium of claim 12, wherein the prompt instructs the service provider to travel to a predetermined location data point, and wherein the set of instructions, when executed by the processor, further causes the network computer system to:
  determine completion of the selected task by determining, based on one or more of the received location data points, that the service provider has traveled to a location data point that is within a predefined distance of the predetermined location data point.

15. The non-transitory computer-readable medium of claim 12, wherein the prompt instructs the service provider to travel to a predetermined location data point in a predetermined manner, and wherein the set of instructions further cause the network computer system to:
  determine completion of the selected task by determining, based on a set of the received location data points, that the service provider has traveled to a location data point that is within a predefined distance of the predetermined location data point in the predetermined manner.

16. A network computer system comprising:
  a network communication interface to communicate, over one or more networks, with a service application executing on a service provider device of a service provider of a transport service;

one or more processors of the network computer system; and a memory resource storing a set of rules and a set of instructions, wherein the set of instructions are being executable by the one or more processors to cause the network computer system to:

classify the service provider as being capable of providing transport services, wherein classifying the service provider includes enabling the service application executing on the service provider device to receive an invitation for providing transport services from the network computer system over the one or more networks;

monitor, over the one or more networks, the service provider device to obtain location information of the service provider;

determine, from monitoring the service provider device, that the service provider has been inactive for a predetermined duration of time since classifying the service provider as being capable of providing the transport service;

classify the service provider as being in capable of providing the transport service based at least on the service provider being determined as being inactive for the predetermined duration of time since classifying the service provider as being capable of providing the transport service;

in response to classifying the service provider as being incapable of providing the transport service, prevent the service application from executing on the service provider device to receive any invitations for providing transport services from the network computer system over the one or more networks;

determine one or more rules from the set of rules that are applicable to the service provider, based on the service provider being classified as incapable;

select a task for the service provider to perform, based on the determined one or more rules;

provide, over the one or more networks, display data to the service application executing on the service provider device to cause the service application to display a prompt instructing the service provider to perform the selected task;

determine whether the service provider has completed the selected task based, at least in part, on location information of the service provider device that is received from the service provider device; and in response to determining completion of the selected task, re-classifying the service provider as being capable of providing transport services.

17. The network computer system of claim 16, wherein the location information of the service provider includes one or more location data points of the service provider device, and wherein the prompt instructs the service provider to wait for a second predetermined duration of time, and wherein determining completion of the selected task includes determining that the service provider has waited for the predetermined duration of time at a particular location based on each of the one or more location data points being within a predefined distance of each other.

18. The network computer system of claim 16, wherein the location information of the service provider includes location data points of the service provider device, and wherein the prompt instructs the service provider to travel to a predetermined location data point, and wherein determining completion of the selected task includes determining, based on one or more of the received location data points, that the service provider has traveled to a location data point that is within a predefined distance of the predetermined location data point.

19. The network computer system of claim 16, wherein the location information of the service provider includes one or more location data points of the service provider device, and wherein the prompt instructs the service provider to travel to a predetermined location data point in a predetermined manner, and wherein determining completion of the selected task includes determining, based on a set of the received location data points, that the service provider has traveled to a location data point that is within a predefined distance of the predetermined location data point in the predetermined manner.

20. The network computer system of claim 16, wherein determining that the service provider has been inactive for the predetermined duration of time further includes at least one of (i) determining that the service provider has not provided transport service for any user during the predetermined duration of time, (ii) determining that the service provider has rejected a specified number of invitations for transport service during the predetermined duration of time, or (iii) determining that the service provider has not traveled more than a predetermined distance from a start location, the start location corresponding to a location of the service provider device, in response to receiving availability information.

* * * * *